United States Patent
Osawa et al.

(10) Patent No.: US 12,497,070 B2
(45) Date of Patent: Dec. 16, 2025

(54) VEHICLE BEHAVIOR GENERATION DEVICE, VEHICLE BEHAVIOR GENERATION METHOD, AND VEHICLE BEHAVIOR GENERATION PROGRAM PRODUCT

(71) Applicant: DENSO CORPORATION, Kariya (JP)

(72) Inventors: Hiroyuki Osawa, Kariya (JP); Akira Itoh, Kariya (JP)

(73) Assignee: DENSO CORPORATION, Kariya (JP)

( * ) Notice: Subject to any disclaimer, the term of this patent is extended or adjusted under 35 U.S.C. 154(b) by 515 days.

(21) Appl. No.: 17/819,561

(22) Filed: Aug. 12, 2022

(65) Prior Publication Data
US 2022/0379918 A1    Dec. 1, 2022

Related U.S. Application Data

(63) Continuation of application No. PCT/JP2020/048688, filed on Dec. 25, 2020.

(30) Foreign Application Priority Data

Feb. 17, 2020  (JP) .................................. 2020-024653

(51) Int. Cl.
*B60W 60/00* (2020.01)
*B60W 30/095* (2012.01)
(Continued)

(52) U.S. Cl.
CPC .... *B60W 60/0011* (2020.02); *B60W 30/0956* (2013.01); *B60W 40/04* (2013.01);
(Continued)

(58) Field of Classification Search
CPC ......... B60W 60/0011; B60W 30/0956; B60W 40/04; B60W 40/105
See application file for complete search history.

(56) References Cited

U.S. PATENT DOCUMENTS

| 7,167,799 B1 * | 1/2007 | Dolgov | G08G 1/164 |
| | | | 701/469 |
| 2009/0024357 A1 * | 1/2009 | Aso | G08G 1/164 |
| | | | 702/181 |

(Continued)

FOREIGN PATENT DOCUMENTS

| JP | 2002-269146 A | 9/2002 |
| JP | 2018-095149 A | 6/2018 |
| WO | 2019106789 A1 | 6/2019 |

OTHER PUBLICATIONS

U.S. Appl. No. 17/819,566 and its entire file history, Aug. 12, 2022, Hiroyuki Osawa.

*Primary Examiner* — Erin M Piateski
*Assistant Examiner* — Gabriel Joseph Rene Lambert
(74) *Attorney, Agent, or Firm* — Maschoff Brennan

(57) ABSTRACT

A vehicle behavior generation device sets multiple possible behaviors of an own vehicle when the own vehicle travels along a planned route; sets multiple possible behaviors of a different vehicle existing around the own vehicle corresponding to each of the set multiple possible behaviors of the own vehicle; outputs information indicating a contact possibility between the own vehicle and the different vehicle for each of combinations of the set multiple possible behaviors of the own vehicle and the set multiple possible behaviors of the different vehicle; and selects one of the multiple possible behaviors of the own vehicle based on the outputted information.

22 Claims, 6 Drawing Sheets

(51) Int. Cl.
*B60W 40/04* (2006.01)
*B60W 40/105* (2012.01)
*B60W 50/00* (2006.01)

(52) U.S. Cl.
CPC ...... *B60W 40/105* (2013.01); *B60W 50/0097* (2013.01); *B60W 60/00274* (2020.02); *B60W 2050/0083* (2013.01); *B60W 2554/4046* (2020.02); *B60W 2555/60* (2020.02)

(56) References Cited

U.S. PATENT DOCUMENTS

| | | | |
|---|---|---|---|
| 2014/0303883 | A1 | 10/2014 | Aso et al. |
| 2017/0031361 | A1* | 2/2017 | Olson .................... G06V 20/56 |
| 2018/0321689 | A1* | 11/2018 | Lehmann ............... G08G 1/163 |
| 2020/0258380 | A1* | 8/2020 | Wissing .................. G08G 1/04 |
| 2021/0004966 | A1* | 1/2021 | Behrendt ................ G06T 7/246 |
| 2021/0053214 | A1 | 2/2021 | Shibata |
| 2021/0123755 | A1* | 4/2021 | Moik .................... B60W 30/09 |
| 2021/0316763 | A1* | 10/2021 | Domahidi ........... B60W 40/105 |

* cited by examiner

VEHICLE BEHAVIOR GENERATION DEVICE, VEHICLE BEHAVIOR GENERATION METHOD, AND VEHICLE BEHAVIOR GENERATION PROGRAM PRODUCT

CROSS REFERENCE TO RELATED APPLICATIONS

The present application is a continuation application of International Patent Application No. PCT/JP2020/048688 filed on Dec. 25, 2020, which designated the U.S. and claims the benefit of priority from Japanese Patent Application No. 2020-024653 filed on Feb. 17, 2020. The entire disclosures of all of the above applications are incorporated herein by reference.

TECHNICAL FIELD

The present disclosure relates to a vehicle behavior generation device, A vehicle behavior generation method, and a vehicle behavior generation program product.

BACKGROUND

Conventionally, a track evaluation device that evaluates a future track to be traveled by a vehicle is known.

SUMMARY

The present disclosure provides a vehicle behavior generation device that: sets multiple possible behaviors of an own vehicle when the own vehicle travels along a planned route; sets multiple possible behaviors of a different vehicle existing around the own vehicle corresponding to each of the set multiple possible behaviors of the own vehicle; outputs information indicating a contact possibility between the own vehicle and the different vehicle for each of combinations of the set multiple possible behaviors of the own vehicle and the set multiple possible behaviors of the different vehicle; selects one of the multiple possible behaviors of the own vehicle based on the outputted information; generates, using a function device, traveling situation related reward data by learning, wherein the generating of traveling situation related reward data includes: (i) simulating multiple combinations of traveling situations of the own vehicle and traveling situations of the different vehicle under multiple different environments; (ii) assigning a first reward to a first traveling situation of the own vehicle in which the own vehicle succeeds in avoiding a contact with the different vehicle; (iii) assigning a second reward to a second situation of the own vehicle in which the own vehicle contacts with the different vehicle, the second reward being set to be lower than the first reward; assigns, with reference to the traveling situation related reward data learned by the function device, a reward to each of the multiple possible behaviors of the own vehicle for each of combinations of the multiple possible behaviors of the own vehicle and the multiple possible behaviors of the different vehicle; outputs the rewards as the information indicating the contact possibility between the own vehicle and the different vehicle; and selects one of the multiple possible behaviors of the own vehicle, which has a highest reward.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
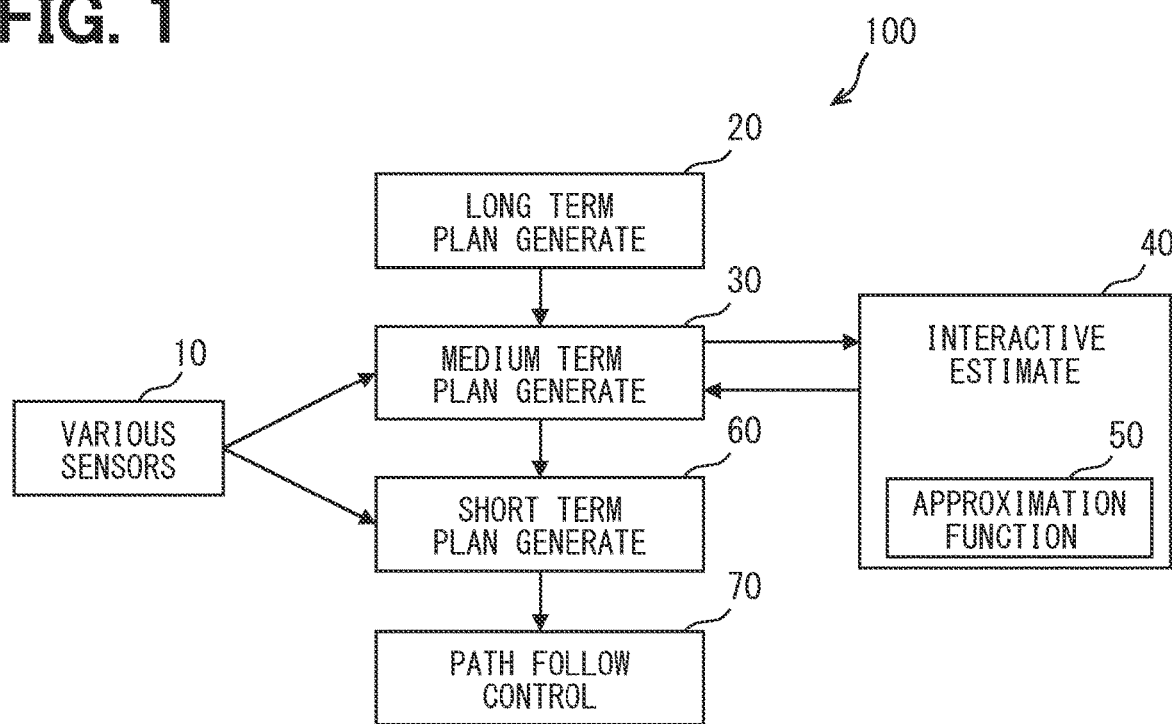
FIG. 1 is a diagram showing a configuration of an autonomous driving system to which a vehicle behavior generation device according to an embodiment of the present disclosure is applied.

There has been known a track evaluation device that evaluates a future track to be traveled by a vehicle. The track evaluation device generates a future traveling track of the vehicle, estimates a future position of an object existing around the vehicle, and evaluates a positional relationship between multiple points on the future traveling track of own vehicle and estimated future position of the object existing around the own vehicle. Specifically, evaluation of the positional relationship is performed by evaluating a longitudinal positional relationship along a longitudinal direction of the road and evaluating a lateral positional relationship along a width direction of the road. Then, based on the evaluation result of each point on the future traveling track of own vehicle, the whole traveling track of own vehicle is evaluated.

The track evaluation device described above is based on the premise that own vehicle and the object perform constant velocity motion or constant acceleration motion when obtaining the future track of own vehicle or the future position of the object.

However, in reality, objects such as the own vehicle and a different vehicles do not always perform constant velocity motion or constant acceleration motion. For example, in a situation where a width of the road usable for driving is narrowed by a vehicle parked in the traveling lane of own vehicle, suppose that the own vehicle starts avoidance driving for avoiding the parked vehicle at an earlier time than a different vehicle traveling in an oncoming traveling lane. In this case, the different vehicle traveling in the oncoming traveling lane may wait until the own vehicle returns to the own traveling lane or may slow down. On the contrary, when the different vehicle traveling in the oncoming traveling lane approaches the parked vehicle at an earlier time than the own vehicle, the own vehicle may wait or slow down so that the different vehicle passes the parked vehicle.

As described above, in an actual traffic environment, a behavior of own vehicle and a behavior of different vehicle mutually affect one another. Therefore, a track generated and evaluated on the premise that own vehicle and the object perform constant velocity motion or constant acceleration motion may not always be effective in an actual traffic situation.

According to an aspect of the present disclosure, a vehicle behavior generation device includes: a first setting unit setting multiple possible behaviors of an own vehicle when the own vehicle travels along a planned route; a second setting unit setting multiple possible behaviors of a different vehicle existing around the own vehicle corresponding to each of the multiple possible behaviors of the own vehicle set by the first setting unit; an output unit outputting information indicating a contact possibility between the own vehicle and the different vehicle for each of combinations of the multiple possible behaviors of the own vehicle set by the first setting unit and the multiple possible behaviors of the different vehicle set by the second setting unit; and a selection unit selecting one of the multiple possible behaviors of the own vehicle based on the information output from the output unit. The output unit includes a function device that generates, by learning, traveling situation related reward data. The function devices generates the traveling situation related reward data by: simulating multiple combinations of traveling situations of the own vehicle and traveling situations of the different vehicle under multiple different environments; assigning a first reward to a first traveling situation of the own vehicle in which the own vehicle succeeds in avoiding a contact with the different vehicle; and assigning a second reward to a second traveling situation of the own vehicle in which the own vehicle contacts with the different vehicle, the second reward being set to be lower than the first reward. The output unit: assigns, with reference to the traveling situation related reward data learned by the function device, a reward to each of the multiple possible behaviors of the own vehicle for each of combinations of the multiple possible behaviors of the own vehicle and the multiple possible behaviors of the different vehicle; and outputs the rewards as the information indicating the contact possibility between the own vehicle and the different vehicle. The selection unit selects one of the multiple possible behaviors of the own vehicle, which has a highest reward assigned by the output unit.

According to another aspect of the present disclosure, a vehicle behavior generation method, which is executed by at least one processor, includes: setting multiple possible behaviors of an own vehicle when the own vehicle travels along a planned route; setting multiple possible behaviors of a different vehicle existing around the own vehicle corresponding to each of the set multiple possible behaviors of the own vehicle; outputting information indicating a contact possibility between the own vehicle and the different vehicle for each of combinations of the set multiple possible behaviors of the own vehicle and the set multiple possible behaviors of the different vehicle; selecting one of the multiple possible behaviors of the own vehicle based on the outputted information; generating, using a function device, traveling situation related reward data by learning, wherein the generating of traveling situation related reward data includes: (i) simulating multiple combinations of traveling situations of the own vehicle and traveling situations of the different vehicle under multiple different environments; (ii) assigning a first reward to a first traveling situation of the own vehicle in which the own vehicle succeeds in avoiding a contact with the different vehicle; (iii) assigning a second reward to a second situation of the own vehicle in which the own vehicle contacts with the different vehicle, the second reward being set to be lower than the first reward; assigning, with reference to the traveling situation related reward data learned by the function device, a reward to each of the multiple possible behaviors of the own vehicle for each of combinations of the multiple possible behaviors of the own vehicle and the multiple possible behaviors of the different vehicle; outputting the rewards as the information indicating the contact possibility between the own vehicle and the different vehicle; and selecting one of the multiple possible behaviors of the own vehicle, which has a highest reward.

According to another aspect of the present disclosure, a vehicle behavior generation program product, which is stored in a computer-readable non-transitory storage medium, is provided. The vehicle behavior generation program product includes instructions to be executed by at least one processor, and the instructions includes: setting multiple possible behaviors of an own vehicle when the own vehicle travels along a planned route; setting multiple possible behaviors of a different vehicle existing around the own vehicle corresponding to each of the set multiple possible behaviors of the own vehicle; outputting information indicating a contact possibility between the own vehicle and the different vehicle for each of combinations of the set multiple possible behaviors of the own vehicle and the set multiple possible behaviors of the different vehicle; selecting one of the multiple possible behaviors of the own vehicle based on the outputted information; generating, using a function device, traveling situation related reward data by learning, wherein the generating of traveling situation related reward data includes: (i) simulating multiple combinations of traveling situations of the own vehicle and traveling situations of the different vehicle under multiple different environments; (ii) assigning a first reward to a first traveling situation of the own vehicle in which the own vehicle succeeds in avoiding a contact with the different vehicle; (iii) assigning a second reward to a second situation of the own vehicle in which the own vehicle contacts with the different vehicle, the second reward being set to be lower than the first reward; assigning, with reference to the traveling situation related reward data learned by the function device, a reward to each of the multiple possible behaviors of the own vehicle for each of combinations of the multiple possible behaviors of the own vehicle and the multiple possible behaviors of the different vehicle; outputting the rewards as the information indicating the contact possibility between the own vehicle and the different vehicle; and selecting one of the multiple possible behaviors of the own vehicle, which has a highest reward.

The above-described vehicle behavior generation device, vehicle behavior generation method, and vehicle behavior generation program product each sets multiple possible behaviors of own vehicle, and sets multiple possible behaviors of the different vehicle corresponding to each of the possible behaviors of own vehicle. For each combination set of own vehicle behavior and different vehicle behavior, information indicating a contact possibility between the own vehicle and the different vehicle is output. Based on the output information, own vehicle behavior that can avoid a contact with the different vehicle at a high possibility is selected. Thus, according to the vehicle behavior generation device, the vehicle behavior generation method, and the vehicle behavior generation program product of the present disclosure, the own vehicle behavior effective in an actual situation can be generated compared with a case where a mutual influence between the own vehicle behavior and the different vehicle behavior is not considered.

First Embodiment

The following will describe embodiments of the present disclosure with reference to the drawings. In the present embodiment, an example in which a vehicle behavior generation device is applied to an autonomous driving system of a vehicle will be described. The application example of the vehicle behavior generation device according to the present disclosure is not limited to the autonomous driving system of the vehicle. For example, the vehicle behavior generation device may be applied to a system that presents, as a recommended behavior, a behavior of own vehicle generated by the vehicle behavior generation device to a driver of the own vehicle.

FIG. 1 shows a configuration of an autonomous driving system 100 to which a vehicle behavior generation device according to the present embodiment is applied. As shown in FIG. 1, the autonomous driving system 100 includes various sensors 10, a long term plan generation unit 20, a medium term plan generation unit 30, an interactive estimation unit 40, a short term plan generation unit 60, and a path follow control unit 70.

The various sensors 10 include, for example, at least one of sensors, such as a camera, a LiDAR, or a millimeter wave radar. The various sensors 10 detect surrounding environment information of own vehicle, own vehicle information indicating a state of own vehicle, and different vehicle information indicating a state of different vehicle existing around the own vehicle. The various sensors 10 detect, as surrounding environment information, obstacles, such as falling objects and vehicles parked on the road, guardrails, curbs, road surface markings, such as traveling lane markings, and stationary objects such as trees. The various sensors 10 also detect, as the surrounding environment information, moving objects including pedestrians, animals other than humans, and different vehicles. The various sensors 10 may detect a position, a direction, a speed, and an acceleration of own vehicle as the own vehicle information. Further, as the own vehicle information, a jerk of own vehicle (change in acceleration per unit time) may be detected. The various sensors 10 may detect a position, a direction, a speed, and an acceleration of different vehicle as different vehicle information. Further, as the different vehicle information, a jerk of different vehicle may be detected. The automatic driving system 100 may acquire, via communication, at least a part of own vehicle information and different vehicle information from an external server, such as a control center.

Based on a departure point (current location) and a destination set by a vehicle occupant, the long term plan generation unit 20 generates, by using a road map database, a route (traveling route) to travel from the departure point (current location) to the destination. The route includes one or more roads. When the vehicle is equipped with a navigation device, the long term plan generation unit 20 may be provided by the navigation device. Alternatively, the long term plan generation unit 20 may be provided in an external server, such as a management center. In this case, the occupant of the vehicle may transmit information about the departure point (current location) and the destination to the external server, and the external server may generate a traveling route to the destination.

The medium term plan generation unit 30 generates a traveling route to the destination in more detail than the traveling route generated by the long term plan generation unit 20. Specifically, the medium term plan generation unit 30 defines a specific lane to be traveled by the own vehicle when the road corresponding to the traveling route has multiple traveling lanes. The medium term plan generation unit 30 acquires the traveling route to the destination generated by the long term plan generation unit 20. The medium term plan generation unit 30 acquires road information (number of lanes, lane width, lane shape, etc.) around the current position of vehicle from the long term plan generation unit 20 (road map database). Further, the medium term plan generation unit 30 acquires the surrounding environment information of own vehicle, the own vehicle information, and the different vehicle information, which are detected by the various sensors 10.

Based on the acquired road information and the own vehicle information, the medium term plan generation unit 30 specifies a lane position indicating the lane in which the own vehicle is traveling when the road on which the own vehicle travels has multiple lanes. When the medium term plan generation unit 30 determines that the different vehicle exists around the own vehicle based on the acquired road information and the surrounding environment information, the medium term plan generation unit 30 further specifies a traveling lane of the different vehicle. Herein, the traveling lane of the different vehicle may be a traveling lane having the same defined traveling direction with the traveling lane of own vehicle, or may be an oncoming traveling lane. Further, when the road has multiple traveling lanes in one direction, the medium term plan generation unit may specify the specific position of the traveling lane of different vehicle.

Based on the acquired traveling route, the road information, the surrounding environment information, and the own vehicle information, the medium term plan generation unit 30 of the own vehicle calculates a planned track up to a predetermined time (for example, 5 seconds ahead) or a predetermined distance (for example, 100 m ahead). The predetermined time or the predetermined distance may be a constant value, or may be a variable value that changes according to a speed of the own vehicle.

For example, when the medium term plan generation unit 30 determines that there is no obstacle in the traveling lane of own vehicle and there is no moving object, such as different vehicle around the own vehicle based on the surrounding environment information, an own vehicle path indicating a planned track of own vehicle may be determined without consideration of interactive estimation executed by the interactive estimation unit 40. In a case where a possibility of contact with an obstacle or a different vehicles is low, the medium term plan generation unit 30 calculates, as the planned track, a track along the traveling lane of own vehicle when the own vehicle travels along the road without making any turn. When the own vehicle makes a right or left turn, or enters in or exits from a branch, the planned track may be calculated corresponding to a shape of the right or left turn road or the branch road. When an obstacle or different vehicle is detected but the obstacle or the different vehicle is not affected by the behavior of own vehicle, the medium term plan generation unit 30 may estimate the behavior of different vehicle in linear manner, and determine the own vehicle path based on the estimation result.

When determining an existence of obstacle, such as a parked vehicle on the road based on the surrounding environment information, the medium term plan generation unit 30 may calculate, as the planned track, a track that can travel along the road while avoiding the obstacle, based on the road information. In addition, when the traveling route includes a right turn or left turn at an intersection ahead of own vehicle and the own vehicle is traveling in a lane different from a right or left turn purpose lane, the medium term plan generation unit 30 calculates the planned track so that the own vehicle makes a lane change to the right or left turn purpose lane.

The medium term plan generation unit 30 may calculate the planned track of own vehicle without considering different vehicle lane position indicating in which lane the different vehicle is traveling and the position of different vehicle even though the different vehicle exists around the own vehicle. The reason is that the interactive estimation unit 40 determines the behavior (own vehicle path and target speed) of own vehicle does not come into contact with the different vehicle when the own vehicle travels along the planned track. Therefore, when the different vehicle exists around the own vehicle, the medium term plan generation unit 30 outputs, to the interactive estimation unit 40, the information necessary for determining the own vehicle path that does not come into contact with the different vehicle. Specifically, the medium term plan creation unit 30 outputs, to the interactive estimation unit 40, current (and past) own vehicle information, lane position information of own vehicle, lane position information of the current (and past) different vehicle information, lane position information of different vehicle, planned track of own vehicle, position and size of obstacle, road information, and the like.

The interactive estimation unit 40 sets multiple kinds of possible behaviors of own vehicle as a first setting unit. Examples of the possible behaviors may include waiting, slow traveling, traveling, and turning on direction indicator. The behaviors may only include traveling of different speeds. That is, the interactive estimation unit 40 may set, as the possible behaviors, a traveling at a speed A and a traveling at a speed B different from the speed A. The interactive estimation unit 40 determines the own vehicle path indicating the planned track of own vehicle when the own vehicle executes each of the set behaviors. The own vehicle path is determined based on the behavior of own vehicle and the planned track of own vehicle. For example, when the own vehicle is awaiting, the own vehicle path stays at the position of own vehicle. When the own vehicle is moving, the own vehicle path is determined so as to trace the planned track of own vehicle. A length of the own vehicle path per hour in a case where the own vehicle travels at a certain speed is different from a length of the own vehicle path per hour in a case where the own vehicle travels at a speed relatively lower (or higher) than the certain speed. A track of own vehicle path based on the planned track may be changed according to the traveling speed of own vehicle. For example, suppose that the planned track has a curve shape. The own vehicle path may be defined such that when the own vehicle travels at a relatively high seed, the own vehicle path has a smaller curvature compared with a case where the own vehicle travels at a relatively low speed.

The interactive estimation unit 40 sets multiple possible behaviors of different vehicle corresponding to each of possible behaviors of own vehicle as a second setting unit. The interactive estimation unit 40 determines a different vehicle path indicating a traveling planned track of the different vehicle when the different vehicle performs each of the possible behaviors set by the second setting unit. The different vehicle path may be determined in the same manner as the own vehicle path described above.

The interactive estimation unit 40 may determine the own vehicle path and the different vehicle path until the predetermined time (for example, 1 to 5 seconds ahead) elapses. As described above, the lengths of own vehicle path and the different vehicle path per hour change corresponding to the behaviors of own vehicle and different vehicle, and the tracks of the own vehicle path and the different vehicle path change corresponding to the behaviors of own vehicle and different vehicle. Thus, the combinations of the own vehicle path relative to each of possible own vehicle behaviors and the different vehicle path relative to each of possible different vehicle behaviors corresponding to one possible own vehicle behavior includes distance (spatial) relationship between the own vehicle and the different vehicle and temporal relationship. Thus, a set of the combinations of the own vehicle path relative to each of possible own vehicle behaviors and the different vehicle path relative to each of possible different vehicle behaviors corresponding to one possible own vehicle behavior is indicated as a spatiotemporal state behavior map indicating a state of the own vehicle and the different vehicle in spatial and temporal manner. The spatiotemporal state behavior map may include incidental information such as own vehicle speed, own vehicle acceleration, and own vehicle direction at each of multiple points included in the own vehicle path, and may include different vehicle speed, different vehicle acceleration, and different vehicle direction at each of multiple points included in the different vehicle path.

Figure 2:
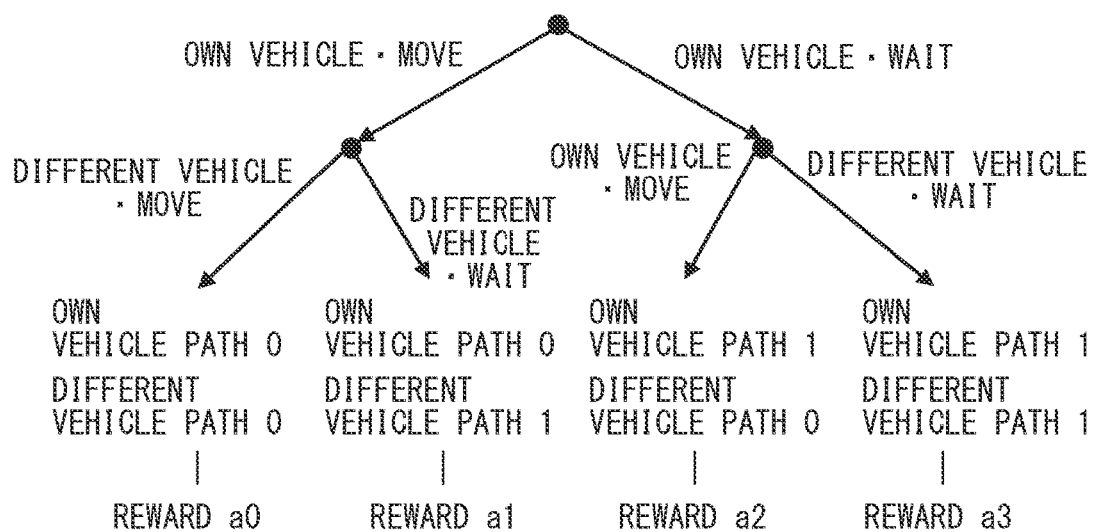
FIG. 2 is a diagram showing an example of a spatiotemporal state behavior map.

FIG. 2 shows an example of the spatiotemporal state behavior map. FIG. 2 shows a simple example in which the possible behaviors of own vehicle and different vehicles include standby and move.

The interactive estimation unit 40 uses an approximation function device 50 to evaluate each combination of multiple possible behaviors of own vehicle and multiple possible behaviors of different vehicle. Herein, the different vehicle may take multiple possible behaviors corresponding to one possible behavior of own vehicle. Here, the approximation function device 50 functions as an output unit that outputs, as an evaluation result, information indicating contact possibility between the own vehicle and the different vehicle. FIG. 2 shows an example in which the information indicating the contact possibility between the own vehicle and the different vehicle is shown by a reward value. Alternatively, the information indicating the contact possibility between the own vehicle and the different vehicle may be shown by any symbol, such as an alphabet under a condition that symbol can indicate a level of contact between the own vehicle and the different vehicle. The evaluation is determined in consideration of the position, speed, and path of the own vehicle and the position, speed, and path of the different vehicle. Then, the interactive estimation unit 40 selects the behavior of own vehicle based on the evaluation result of the approximation function device 50. The interactive estimation unit 40 corresponds to a selection unit. Specifically, the selection unit selects the behavior of own vehicle, which is likely to prevent the own vehicle from coming into contact with the different vehicle, and outputs information indicating the behavior to the medium term plan generation unit 30. For example, the interactive estimation unit 40 outputs, to the medium term plan generation unit 30, information indicating the own vehicle behavior having the maximum reward value. The information indicating the own vehicle behavior may be one of multiple own vehicle behaviors that have been set. In addition to the one own vehicle behavior, the own vehicle path corresponding to the one own vehicle behavior and target speeds of own vehicle at predetermined time interval (for example, 1 second interval) when the vehicle travels along the own vehicle path may be output to the medium term plan generation unit 30. The latter is preferable because it can reduce the calculation load of the short term plan generation unit 60 that generates a more detailed traveling track. The evaluation method using the approximation function device 50 will be described in detail later. The medium term plan generation unit 30 and the interactive estimation unit 40 correspond to the vehicle behavior generation device in the present disclosure.

Figure 5:
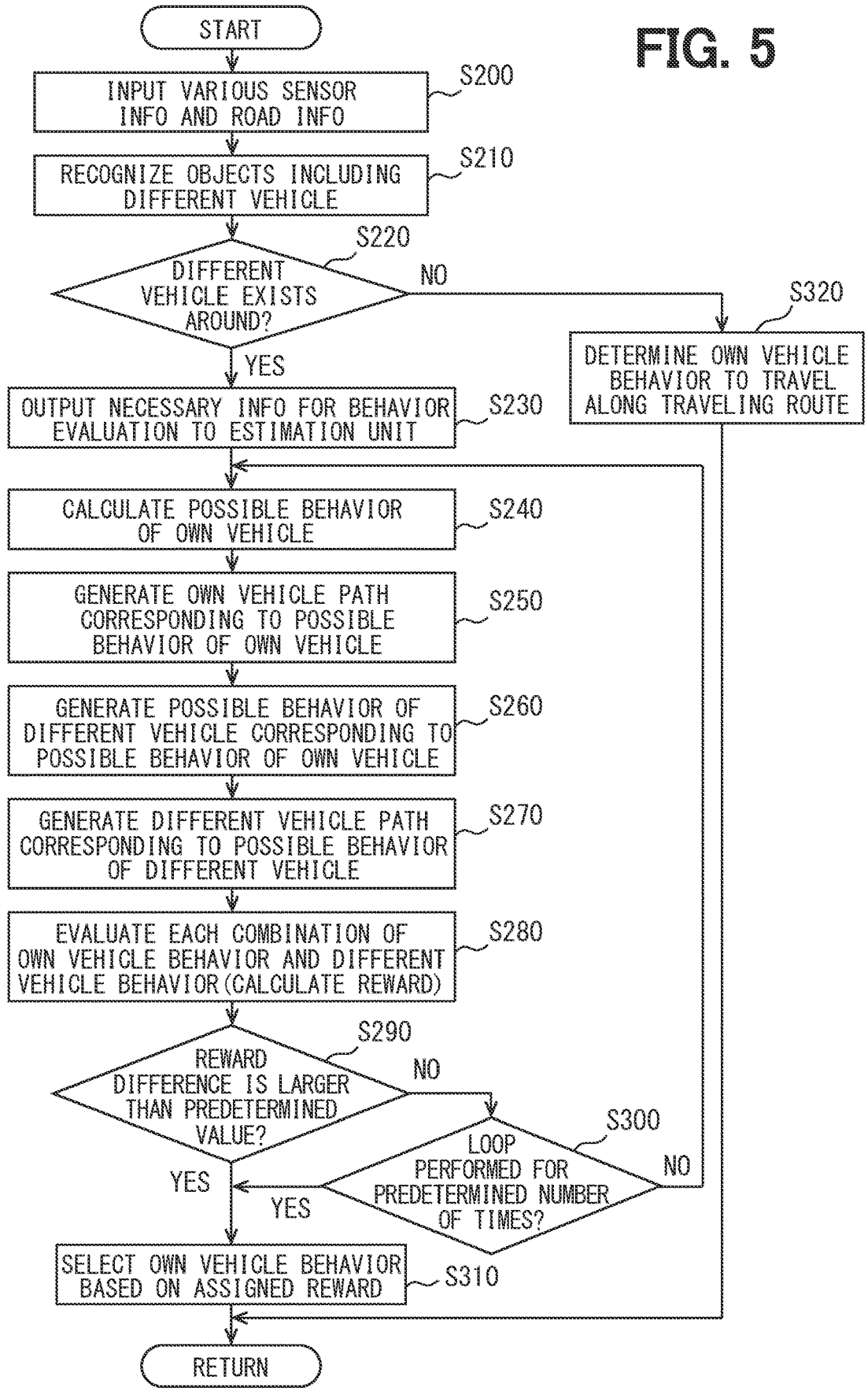
FIG. 5 is a flowchart showing a own vehicle behavior generation process that generates an own vehicle behavior.

The medium term plan generation unit 30 and the interactive estimation unit 40 are configured by, for example, an in-vehicle ECU of the own vehicle. The in-vehicle ECU is a computer mounted on a vehicle and mainly includes a microcomputer having at least one processor, a computer-readable non-transitory storage medium such as RAM and ROM, an input/output interface, and a bus connecting these components. A program for executing the vehicle behavior generation process shown in FIG. 5 is stored in the non-transitory storage medium included in the in-vehicle ECU. Then, the processor included in the in-vehicle ECU executes the program. The medium term plan generation unit 30 and the interactive estimation unit 40 may be configured by one in-vehicle ECU or by separate multiple in-vehicle ECUs. The functions of the medium term plan generation unit 30 and the interactive estimation unit 40 may be provided on an external server that can communicate with the own vehicle. The external server is located outside of the own vehicle.

The medium term plan generation unit 30 receives the information indicating the own vehicle behavior output from the interactive estimation unit 40, and outputs the received information to the short term plan generation unit 60. The short term plan generation unit 60 generates a short term plan (for example, 1 to 2 seconds) for actually controlling the behavior of own vehicle based on the received information indicating the behavior of own vehicle (for example, the own vehicle path and the target speed), and outputs the generated short term plan to the path follow control unit 70. The detailed traveling track of own vehicle is determined as described above. The short term plan generation unit 60 also receives detection signals from various sensors 10. When an unexpected situation (for example, behavior of different vehicle different from the estimated behavior, a sudden appearance of a moving object from a blind spot or the like) occurs, the short term plan generation unit 60 can respond to the unexpected situations by generating the short term plan of, for example, making an emergency stop of own vehicle, or changing the traveling direction of own vehicle.

The path follow control unit 70 includes a steering control unit, an engine control unit, a brake control unit, and the like. The path follow control unit 70 controls a steering direction, a driving force, and a braking force of own vehicle in accordance with the short term plan generated by the short term plan generation unit 60 to control the behavior of own vehicle. The short term plan generation unit 60 and the path follow control unit 70 may be configured by, for example, an in-vehicle ECU of own vehicle.

Figure 3:
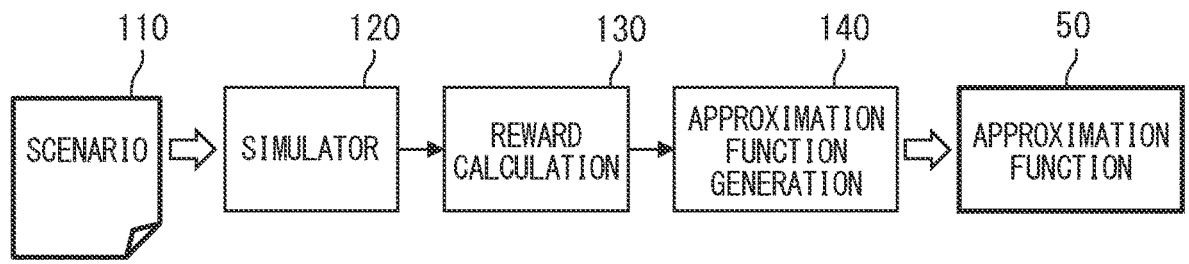
FIG. 3 is a diagram showing an example of a generation method of creating an approximation function device.

The following will describe an evaluation method using the approximation function device 50 in the interactive estimation unit 40. First, an exemplary generation method of the approximation function device 50 will be described with reference to FIG. 3. As shown in FIG. 3, the approximate function device 50 is generated by a simulator 120, a reward calculation unit 130, and an approximation function generation unit 140. The simulator 120, the reward calculation unit 130, and the approximation function generation unit 140 are disposed outside the vehicle.

The simulator 120 generates, corresponding to various scenarios indicating own vehicle behavior and different vehicle behavior in various traffic environments (turning left or right, overtaking, bypassing an obstacle to avoid the obstacle, merging, branching, etc.), traveling track of own vehicle and traveling track of different vehicle in the various traffic environments, and simulates the traveling situation of own vehicle and different vehicle. The simulated traveling situation of own vehicle and different vehicle is accompanied by a speed change of own vehicle and different vehicle, which also include a stop. Further, the simulated traveling situation includes a traveling situation in which a contact between the own vehicle and the different vehicle is avoided, and also includes a traveling situation in which a contact occurs between the own vehicle and the different vehicle The traveling situation of own vehicle and different vehicle may be divided into multiple steps, and the simulator 120 may output, to the reward calculation unit 130, traveling data that indicates the traveling situation of own vehicle and different vehicle in each step. Specifically, the simulator 120 outputs, as the traveling data in each step, a state of own vehicle, such as a position of own vehicle, a speed of own vehicle, and an acceleration of own vehicle, the planned route of own vehicle, a position of obstacle, a state of different vehicle, such as a position of different vehicle, a speed of different vehicle, and an acceleration of different vehicle, and an elapsed time, to the reward calculation unit 130.

The reward calculation unit 130 assigns a reward to the traveling situation of own vehicle and different vehicle based on the received traveling data. The following will describe some calculation examples of reward. The reward calculation unit 130 calculates a first cost based on a distance between the own vehicle and an objection, such as the different vehicle. The distance can be acquired from or based on the traveling data. The first cost is set to be increased with a decrease of the distance. When multiple objects (for example, an obstacle and a different vehicle) exist around the own vehicle, the first cost is calculated for each object. This is because it is considered that the shorter the distance between the own vehicle and the object, the higher the possibility of contact. The reward calculation unit 130 calculates a second cost, which is given as a penalty, when the own vehicle and the different vehicle come into contact with one another. When the own vehicle and the different vehicle come into contact with one another, the reward calculation unit 130 calculates a third cost with respect to a traveling situation before the contact occurs. The third cost is set to be increased with a decrease of a contact time taken for the own vehicle and the difference vehicle contact with one another. Then, the reward calculation unit 130 calculates, as the reward, a reciprocal of a sum of the first to third costs. The reward is set to be high corresponding to the traveling situation in which the possibility of avoiding contact with the different vehicle is high, and conversely, the reward is set to be low corresponding to the traveling situation in which the possibility of contacting with the different vehicle is high.

The reward calculation unit 130 calculates a fourth cost that is set to be increased with an increase of time (elapsed time) required for the own vehicle to avoid contact with the different vehicle. The fourth cost may also be taken into consideration, in addition to the sum of the first to third costs, that is, the reciprocal of the sum of the first to fourth value may be calculated as the reward. By considering the elapsed time, it is possible to give a higher reward to the traveling situation (behavior of own vehicle) that can avoid contact with the different vehicle more quickly.

The reward calculation unit 130 calculates a fifth cost that is set to be increased as a duration and/or a distance that the own vehicle deviates from the traveling lane in which the own vehicle should travel becomes longer. The reward calculation unit 130 may also take the fifth cost into consideration when calculating the reward. For example, a parked vehicle in the traveling lane of own vehicle may block a part of the traveling lane, and the own vehicle must drive at least partially or completely in the oncoming lane in order to avoid the parked vehicle. In this case, the longer the time traveled in the oncoming lane and/or the longer the distance traveled in the oncoming lane, the higher the possibility of contact with different vehicle. The reward calculation unit 130 may calculate a sixth cost that is set to be increased as the acceleration of own vehicle increases, and may calculate the reward by taking the sixth cost into consideration. It is considered that the higher the acceleration of own vehicle, the higher the possibility of contact with different vehicle.

The reward assigned to the behavior of own vehicle may be based on different costs reflecting the possibility of contact between the own vehicle and different vehicle in addition to or instead of the above-described first to sixth costs. In the above-described first to sixth costs, the second cost, which is set as a penalty for the traveling situation of contact occurrence between the own vehicle and the different vehicle, is set to have a relatively large value compared with other costs. The third cost assigned to the traveling situation of the previous step of contact occurrence between the own vehicle and the different vehicle may be calculated by discounting the second cost at a discount rate corresponding to the time taken until the contact occurs. Specifically, the discount rate may be set to be decreased with a decrease of the time taken until the contact occurs. Therefore, it is possible to give a very low reward to the traveling situation in which the own vehicle and the different vehicle come into contact with one another or the traveling situation in which the own vehicle and the different vehicle potentially come into contact with one another.

The reward calculation unit 130 assigns the reward according to the possibility of contact (or the possibility of avoiding contact) for various traveling situations between the own vehicle and the different vehicle, thereby generating the traveling situation related reward data. The generated traveling situation related reward data is provided to the approximation function generation unit 140. The reward calculation unit 130 may provide the individual traveling situation and the reward data corresponding to the individual traveling situation to the approximation function generation unit 140. Alternatively, the reward calculation unit 130 may collectively provide, for each planned route of own vehicle, the traveling situations and related reward data included in each planned route, to the approximation function generation unit 140.

The approximation function generation unit 140 controls the approximation function device 50 to perform learning, based on the traveling situation related reward data generated by the reward calculation unit 130, about the relationship between the various traveling situations (spatiotemporal states) of the own vehicle and the different vehicle and the rewards. A deep neural network can be used as the approximation function device 50, and well known deep Q-learning can be used as an example of learning method.

The approximation function device 50 is not limited to the neural network, and for example, a support vector machine (SVM) or the like may be used as the approximation function device. Such an approximation function device 50 can assign, as an evaluation value to the behavior of own vehicle, the reward to the own vehicle for each combination of each of possible own vehicle behaviors and each of possible different vehicle behaviors included in the spatiotemporal state behavior map. Herein, the possible different vehicle behaviors are defined corresponding to each of possible own vehicle behaviors. The calculation of reward is performed based on the own vehicle position, own vehicle speed, own vehicle path, different vehicle position, different vehicle speed, and different vehicle path. An example in which a function generated in advance is mounted on the own vehicle as the approximation function device 50 is described in the present embodiment. Alternatively, the function related to the approximation function device 50 may be newly learned based on past evaluation results and vehicle travel history.

Figure 4:
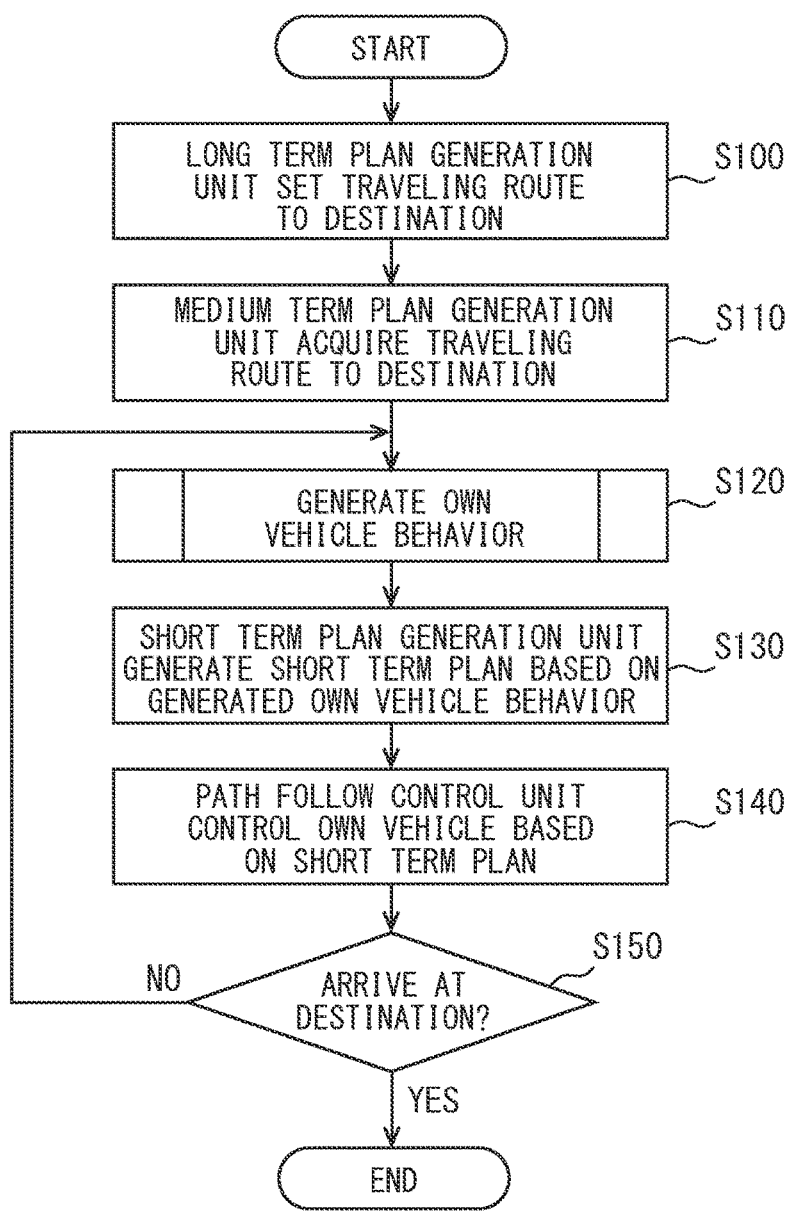
FIG. 4 is a flowchart showing a process executed by the autonomous driving system shown in FIG. 1 to perform an autonomous driving of a vehicle.

The following will describe a process executed by the autonomous driving system 100 shown in FIG. 1 to perform the autonomous driving of the vehicle with reference to the flowchart shown in FIG. 4.

In S100 of the flowchart shown in FIG. 4, the long term plan generation unit 20 sets, using a road map database, a route (traveling route) to travel from the departure point (current location) to the destination. The route includes one or more roads. In S110, the medium term plan generation unit 30 acquires the traveling route to the destination set by the long term plan generation unit 20.

In S120, the medium term plan generation unit 30 and the interactive estimation unit 40 generate own vehicle behavior, which includes own vehicle path and target speed and to be executed by the own vehicle. The own vehicle behavior generation process will be described in detail later with reference to the flowchart shown in FIG. 5. In S130, the short term plan generation unit 60 generates a short term plan for actually controlling the movement of own vehicle based on the generated own vehicle behavior. In S140, the path follow control unit 70 controls the movement of own vehicle by controlling the steering direction, the driving force, and the braking force of own vehicle according to the generated short term plan.

In S150, the process determines whether the own vehicle arrives at the set destination. In response to determining NO in S150, the process returns to S120 and repeats S120 and the following process. When the destination is changed, the process is executed again from the first, that is, from S100.

The vehicle behavior generation process executed by the medium term plan generation unit 30 and the interactive estimation unit 40 will be described with reference to the flowchart shown in FIG. 5. The vehicle behavior generation process corresponds to the above-described process in S120.

In S200, the road information around the current position of own vehicle, the surrounding environment information, and the own vehicle information detected by various sensors 10 are acquired. In S210, the shape, position, size, and moving or stationary state of the object are recognized based on the surrounding environment information. The object may include the different vehicle.

In S220, the process determines whether a different vehicle exists around the own vehicle based on the recognition result in S210. In response to determining that a different vehicle exists around the own vehicle, the process proceeds to S230. In response to determining that there is no different vehicle around the own vehicle, the process proceeds to S320.

In S230, the process outputs, to the interactive estimation unit 40, information necessary for setting the possible own vehicle behavior that the own vehicle can take and the possible different vehicle behavior that the different vehicle can take with respect to the own vehicle behavior. Further, the process outputs, to the interactive estimation unit 40, information necessary for evaluating the own vehicle behavior in each combination of own vehicle behavior and different vehicle behavior. Specifically, the process outputs own vehicle state information, such as the current and past own vehicle positions, own vehicle direction, own vehicle speed, and own vehicle acceleration, own vehicle lane position information indicating the lane in which the own vehicle is traveling, different vehicle state information, such as the current and past different vehicle positions, different vehicle direction, different vehicle speed, different vehicle acceleration, different vehicle lane position information indicating the lane in which the different vehicle is traveling, planned track of own vehicle, the obstacle position, the obstacle size, the road information, such as road shape, number of lanes, etc.

In S240, the interactive estimation unit 40 sets multiple possible own vehicle behaviors that the own vehicle can take, and the possible own vehicle behaviors include at least waiting or moving based on various acquired information. In S250, the interactive estimation unit 40 determines the own vehicle path indicating the planned track of own vehicle when the own vehicle executes each of the set behaviors.

In S260, the interactive estimation unit 40 sets, for each own vehicle behavior, multiple different vehicle behaviors that the different vehicle can take. The different vehicle behaviors include at least waiting or moving of the different vehicle. In S270, the interactive estimation unit 40 determines the different vehicle path indicating the planned track of different vehicle when the different vehicle executes each of the set behaviors.

In S280, the interactive estimation unit 40 assigns the reward to each combination of each of possible own vehicle behaviors and each of possible different vehicle behaviors using the approximation function device 50. Herein, the possible different vehicle behaviors are defined corresponding to each of possible own vehicle behaviors. The assignment of reward is performed based on the own vehicle position, own vehicle speed, own vehicle path, different vehicle position, different vehicle speed, and different vehicle path. For example, under the environment grasped based on the road shape, the number of lanes, planed traveling route of own vehicle, obstacle position, obstacle direction, and obstacle size, the approximation function device 50 calculates the reward for each combination at each point based on learning contents. Each combination is the combination of (i) own vehicle position, own vehicle direction, own vehicle speed, own vehicle acceleration at each point included in the own vehicle path and (ii) different vehicle position, different vehicle direction, different vehicle speed, different vehicle acceleration at each point included in the different vehicle path. Then, by summing the rewards at multiple points included in the own vehicle path and summing the rewards at multiple points included in the different vehicle path, the reward of own vehicle behavior in each combination of own vehicle behavior and different vehicle behavior is calculated.

Figure 6:
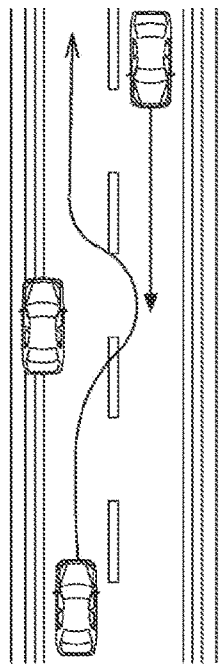
FIG. 6 is a diagram showing possible behaviors of own vehicle and a different vehicle in a situation where the own vehicle has to avoid a parked vehicle existing on a traveling lane of the own vehicle and the different vehicle travels in an oncoming lane toward the own vehicle.

As shown in FIG. 6, suppose that the own vehicle has to avoid a parked vehicle existing on the traveling lane of own vehicle and the different vehicle travels in the oncoming lane toward the own vehicle. In this situation, the own vehicle has to avoid the parked vehicle to pass the parked vehicle. For example, suppose that the own vehicle approaches the parked vehicle at an earlier time and can perform avoidance driving for avoiding the parked vehicle at an earlier time than the different vehicle traveling in the oncoming traveling lane. In this case, the different vehicle traveling in the oncoming traveling lane may wait until the own vehicle returns to the own traveling lane or may slow down. The traveling situation related reward data also includes such traveling situation. In this case, a relatively high reward is assigned to the own vehicle behavior which avoids the parked vehicle for passing by the parked vehicle. In this traveling situation, a high reward is assigned to the own vehicle behavior, in which the own vehicle continues traveling by avoiding the parked vehicle, for the combination of own vehicle behavior and different vehicle behavior.

On the contrary, when the different vehicle traveling in the oncoming traveling lane approaches the parked vehicle at an earlier time than the own vehicle, the own vehicle has to wait or slow down at a position close to the parked vehicle so that the different vehicle passes the parked vehicle. The traveling situation related reward data also includes such traveling situation. In this case, a high reward is assigned to the own vehicle behavior which waits for or slows down so that the different vehicle passes by the parked vehicle first. In this traveling situation, a high reward is assigned to the own vehicle behavior, in which the own vehicle waits or slows down, for the combination of own vehicle behavior and different vehicle behavior.

In the present embodiment, as described above, the approximation function device 50 is used for assign the reward to the own vehicle for each combination of multiple own vehicle behaviors that the own vehicle can take and the multiple different vehicle behaviors that the different vehicle can take with respect to each own vehicle behavior. Thus, it is possible to assign a high reward to the own vehicle behavior that is suitable for the actual situation.

The description of process shown in FIG. 5 will be continued. In S280, the reward is assigned to the own vehicle behavior included in each combination of own vehicle behaviors and different vehicle behaviors. Then, the process proceeds to S290. In S290, the process determines whether a difference, which is equal to or greater than a predetermined value, occurs between the highest reward among the assigned rewards and the second highest reward among the assigned rewards. In S290, in response to determining that the difference being equal to or greater than the predetermined value exists, the process proceeds to S310. In S290, in response to determining that the difference being equal to or greater than the predetermined value does not exist, the process proceeds to S300.

In response to there is no difference being equal to or greater than the predetermined value between the highest reward and the second highest reward, it is considered that the superiority or inferiority of which behavior of the own vehicle is the most suitable behavior cannot be completely determined. In the present embodiment, the setting of combinations of multiple own vehicle behaviors and different vehicle behaviors, the setting of multiple own vehicle behaviors that the own vehicle can take, the determination of own vehicle path when the own vehicle performs each of set own vehicle behaviors, setting of multiple different vehicle behaviors that the different vehicle can take with respect to each of own vehicle behaviors, and determination of different vehicle path when the different vehicle performs each different vehicle behavior are repeated as a loop in S240. In the execution of loop, corresponding to the different vehicle behavior and the different vehicle path, the own vehicle behavior and how the own vehicle path may be affected is taken into consideration. When executing the loop again, the different vehicle behavior and the influence to the different vehicle path are considered according to the own vehicle behavior and the own vehicle path considered in the previous loop. By looping the process in this way, it is possible to estimate, with high accuracy, what kind of behavior change will occur in the own vehicle and/or the different vehicle with respect to the behavior taken by the own vehicle and/or the different vehicle. If the loop is allowed to be executed indefinitely, the loop may be repeated indefinitely and the behavior of own vehicle cannot be determined. Thus, in S310, the process determines whether the number of loop has reached a predetermined number of times. When the repeat number of loop has not reached the predetermined number of times, the process returns to S240 and executes S240 and following process. When the repeat number of loop has reached the predetermined number of times, the process proceeds to S310.

In S310, the own vehicle behavior to which the highest reward is assigned is selected based on the multiple assigned rewards. Then, the interactive estimation unit 40 outputs information (own vehicle path and target speed) regarding the selected behavior of own vehicle to the medium term plan generation unit 30. In S310, instead of selecting the own vehicle behavior based on the reward, the interactive estimation unit 40 may instruct the medium term plan generation unit 30 to perform another behavior. For example, the medium term plan generation unit 30 may be instructed to maintain the current speed/acceleration of the own vehicle, gradually reduce the speed, or stop the vehicle.

In S220, in response to determining that no different vehicle exists around the own vehicle, the medium term plan generation unit 30 may determine, in S320, the own vehicle behavior based on the road information so as to control the own vehicle to travel along the traveling route. For example, when the own vehicle travels along the road, the planned track along the lane in which the own vehicle travels may be calculated, and the target speed when traveling on the planned track may be calculated. When the own vehicle makes a right/left turn, a branch, or the like, the medium term plan generation unit 30 may calculate a planned track and a target speed according to the road shape of the right/left turn or the road shape of branch.

As described above, according to the vehicle behavior generation device of the present embodiment, the own vehicle behavior is evaluated in each combination of the own vehicle behavior and the different vehicle behavior. Thus, the own vehicle behavior and the different vehicle behavior, which mutually affect one another, can be considered, and it is possible to generate the own vehicle behavior that is effective in the actual situation.

In the vehicle behavior generation device of the present embodiment, the process performed to generate the own vehicle behavior corresponds to the vehicle behavior generation method of the present disclosure. The program executed by the vehicle behavior generation device to perform the vehicle behavior generation method corresponds to the vehicle behavior generation program of the present disclosure.

Second Embodiment

The following will describe a second embodiment of the present disclosure. The vehicle behavior generation device according to the present embodiment is similar to the vehicle behavior generation device according to the first embodiment, and the description of the same configuration will be omitted for simplification.

In the above-described first embodiment, as an example shown in FIG. 6, possible behaviors of own vehicle and different vehicle are described in a situation where the own vehicle has to avoid the parked vehicle existing in the traveling lane of the own vehicle and the different vehicle travels in an oncoming lane toward the own vehicle. In a case where the different vehicle exists and a driver of the different vehicle is in a hurry, the behavior of different vehicle may be different from the behavior of different vehicle when the driver of the different vehicle is not in a hurry. The present embodiment is different from the first embodiment in that such driving characteristic of different vehicle is also taken into consideration.

Figure 7:
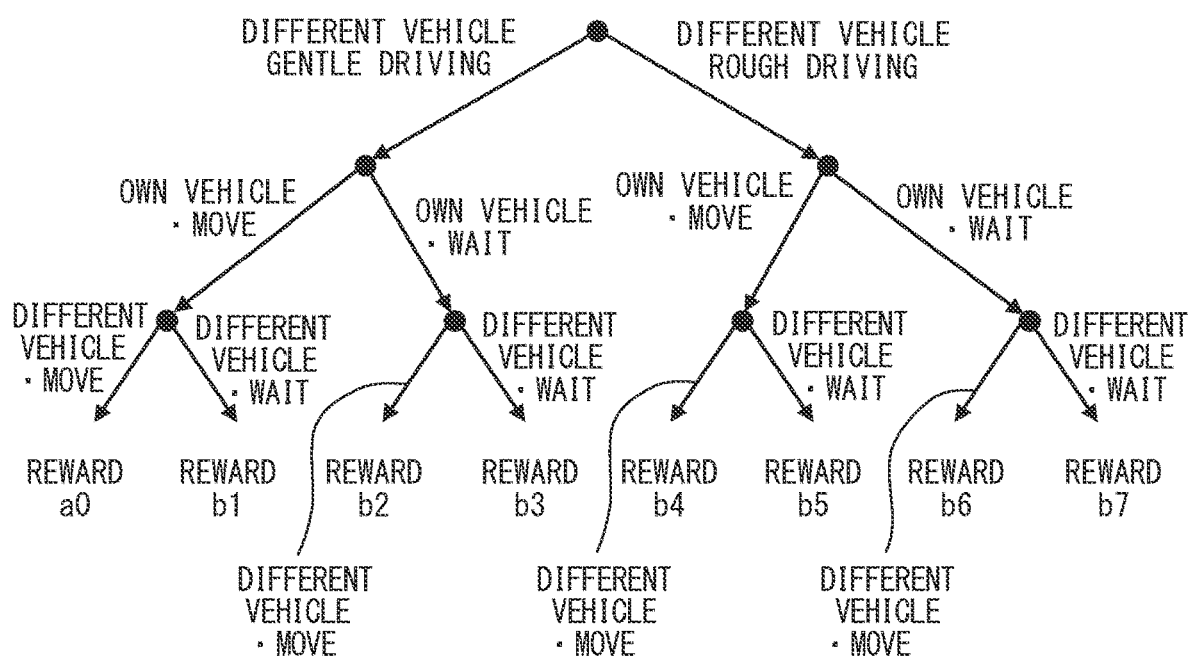
FIG. 7 is a diagram showing an example of a spatiotemporal state behavior map in consideration of a driving characteristic of the different vehicle.

In the present embodiment, as shown in FIG. 7, the driving characteristic of different vehicle is taken into consideration in the spatiotemporal state behavior map. Specifically, based on the movement of the different vehicle detected by the various sensors 10, the vehicle behavior generation device determines whether the different vehicle has the driving characteristic of rough driving or gentle driving. Since it is difficult to determine whether the different vehicle has intense driving characteristic or gentle driving characteristic only based on the movement of different vehicle within a short time, for example, a probability of intense driving characteristic and a probability of rough driving characteristic may be calculated. Alternatively, the driving characteristic of different vehicle may be classified into three or more categories, for example, intense, average, and gentle.

When the driving characteristic of different vehicle can be determined, it is sufficient to consider only the combination of own vehicle behavior and different vehicle behavior, which are branched with respect to the driving characteristic. However, when the probability is calculated for each driving characteristic of the different vehicle, the own vehicle path and the different vehicle path is determined for the combination of the own vehicle behavior and the different vehicle behavior that are branched corresponding to each driving characteristic of the different vehicle. In this configuration, the driving characteristic of different vehicle may be considered as the different vehicle behavior. For example, the speed and acceleration of the different vehicle having rough driving characteristic can be estimated to be higher than the speed and acceleration of the different vehicle having gentle driving characteristic. Then, the reward finally assigned to the own vehicle behavior may be increased or decreased according to the probability of each driving characteristic.

Figure 8:
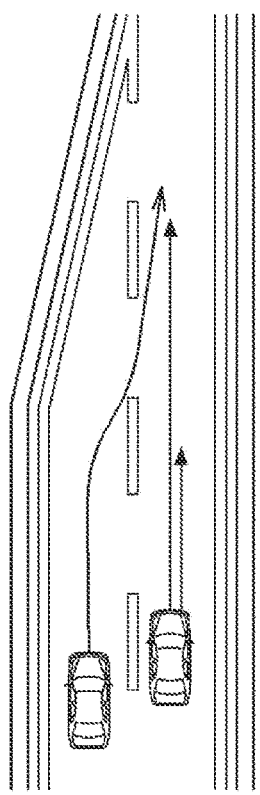
FIG. 8 is a diagram showing an example in which a driving characteristic of different vehicle is considered in a situation where the different vehicle existing close to the own vehicle travels on a main traveling lane and the own vehicle is going to enter the main traveling lane from an access road.

The following will describe, using an exemplary situation shown in FIG. 8, a situation in which the different vehicle driving characteristic is additionally considered compared with the situation shown in FIG. 6 described in the first embodiment. FIG. 8 shows a situation where the different vehicle existing close to the own vehicle travels on a main traveling lane and the own vehicle is going to enter the main traveling lane from an access road. In the situation shown in FIG. 8, when the vehicle has rough driving characteristic, it is likely to continue traveling at a high speed, as indicated by a longer arrow. On the other hand, when the different vehicle has gentle driving characteristic, there is a high possibility that the different vehicle speed will be reduced so that the own vehicle can join the main traveling lane. The traveling situation related reward data also includes the rough driving characteristic of different vehicle and the gentle driving characteristic of different vehicle. Therefore, the approximation function device 50 gives a relatively high reward to the own vehicle behavior that reduces the speed when the different vehicle has the rough driving characteristic. When the different vehicle has gentle driving characteristic, the approximation function device 50 gives a relatively high reward to the own vehicle behavior that joins the main traveling at a position in front of the different vehicle. As described above, even when the relative positional relationship between the different vehicle and the own vehicle is the same, the optimum action to be taken by the own vehicle may be different due to the vehicle driving characteristic.

As a driving situation similar to FIG. 8, for example, when the own vehicle needs to change from the current lane to a target lane and the different vehicle is traveling in the target lane, the driving characteristic of different vehicle may be taken into consideration. Further, the driving characteristic of different vehicle may be taken into consideration in all situations where the different vehicle exists around the own vehicle.

Third Embodiment

The following will describe a third embodiment of the present disclosure. The vehicle behavior generation device according to the present embodiment is similar to the vehicle behavior generation device according to the first embodiment, and the description of the same configuration will be omitted for simplification.

In the second embodiment described above, the spatiotemporal state behavior map is generated in consideration of the driving characteristic of different vehicle. In the present embodiment, the spatiotemporal state behavior map is generated in consideration of the traffic signal state different from the second embodiment.

Figure 9:
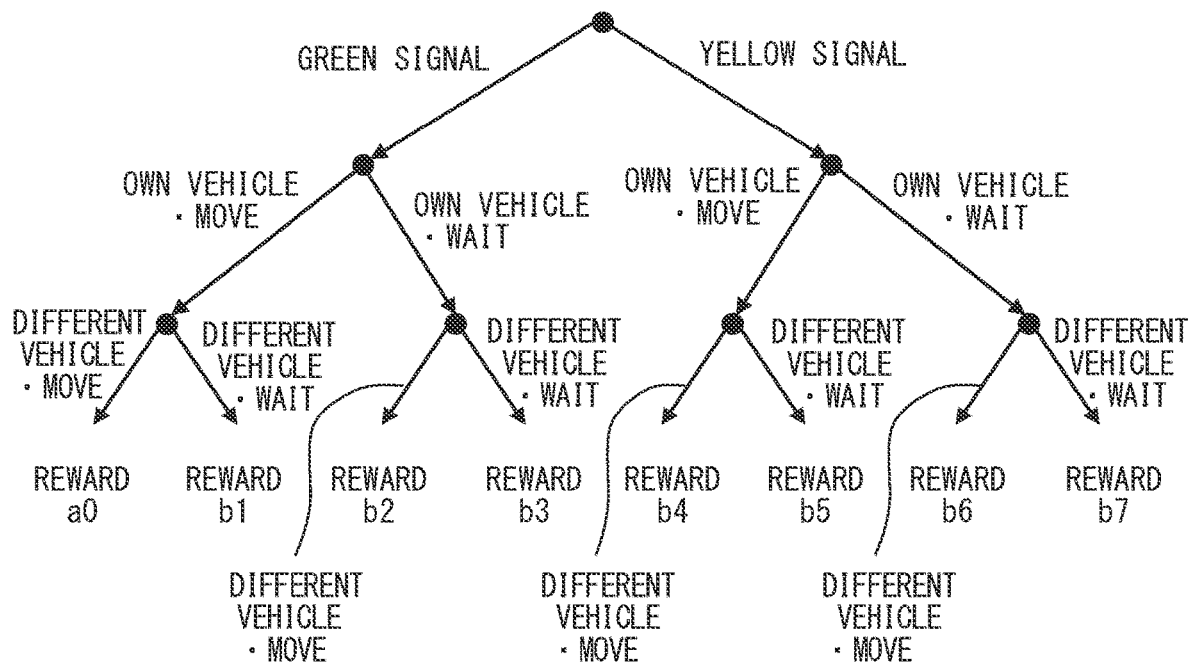
FIG. 9 is a diagram showing an example of a spatiotemporal state behavior map considering a state of traffic signal.
Figure 10:
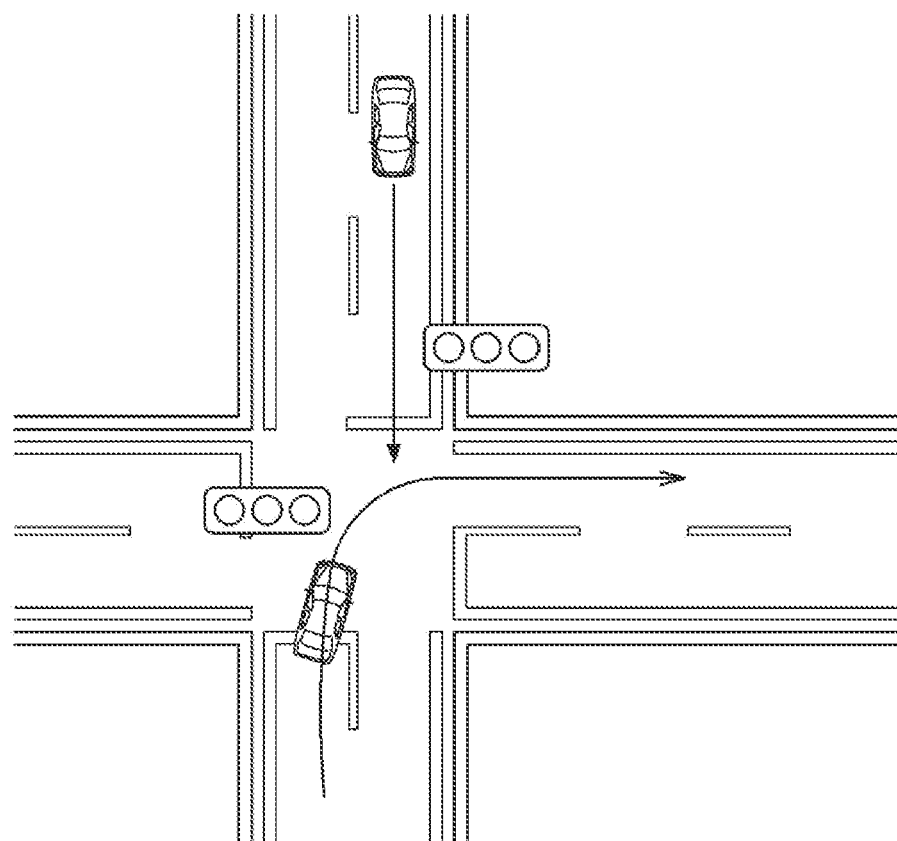
FIG. 10 is a diagram showing an example in which a driving characteristic of different vehicle is considered in a situation where the different vehicle travels in an oncoming lane and the own vehicle is waiting for a right turn at an intersection with a signal.

In the present embodiment, as shown in FIG. 9, the traffic signal state is taken into consideration in the spatiotemporal state behavior map. Specifically, as shown in FIG. 10, when the own vehicle is about to turn right at an intersection and the different vehicle travels in the oncoming lane toward the intersection, the spatiotemporal state behavior map is generated corresponding to the traffic signal state. The traffic signal state may be determined, based on the detection results detected by the various sensors 10, whether the traffic signal state is the blue signal state or the yellow signal state. Further, when the traffic signal further includes a right turn arrow signal, a turn-on state of the right turn arrow signal may be determined.

When blue traffic signal is detected in the spatiotemporal state behavior map shown in FIG. 9, the own vehicle path and the different vehicle path are determined corresponding to the combination of the own vehicle behavior and the different vehicle behavior, which are divided from the green signal branch. In the case of green signal, the different vehicle approaching the intersection in the oncoming lane is prioritized over the right turn of own vehicle. The traveling situation related reward data also includes this kind of traveling situation. Therefore, it is highly possible that the approximation function device 50 assigns a high reward to the combination of own vehicle behavior and different vehicle behavior in which the own vehicle waits until the different vehicle passes by the intersection first. In a traveling situation where a relatively long time is required for the different vehicle to enter the intersection, the approximation function device 50 assigns a high reward to the combination of own vehicle behavior and different vehicle behavior in which the own vehicle indicates a right turn using a direction indicator.

When yellow traffic signal is detected in the spatiotemporal state behavior map shown in FIG. 9, the own vehicle path and the different vehicle path are determined corresponding to the combination of the own vehicle behavior and the different vehicle behavior, which are divided from the yellow signal branch. In the case of yellow traffic signal, the different vehicle approaching the intersection in the oncoming lane is required to stop at the stop line of the intersection, and the own vehicle waiting for the right turn proceeds for the right turn. The traveling situation related reward data also includes this kind of traveling situation. Therefore, it is highly possible that the approximation function device 50 assigns a high reward to the combination of own vehicle behavior and different vehicle behavior in which the own vehicle proceeds to take right turn and the different vehicle stops at the stop line. When the right turn arrow signal is turned on, it is more likely that the own vehicle should proceed for right turn. By considering the traffic signal state, it becomes possible to select a more appropriate action as the action of the own vehicle in the situation where the own vehicle encounters an actual traffic environment.

The present disclosure is described with multiple embodiments as described above. However, the present disclosure is not limited to the above-mentioned embodiments, and may be variously modified within the spirit and scope of the present disclosure.

For example, in the above-described embodiment, the autonomous driving system 100 includes the long term plan generation unit 20, the medium term plan generation unit 30, and the short term plan generation unit 60. Alternatively, partial of the long term plan generation unit 20, the medium term plan generation unit 30, and the short term plan creation unit 60 may be included in the autonomous driving system. Further, as the vehicle behavior generation device, the medium term plan generation unit 30 and the interactive estimation unit 40 may be integrated and configured as one body.

What is claimed is:
1. A vehicle behavior generation device applied to an autonomous driving system controlling a vehicle to perform an autonomous driving, the vehicle behavior generation device comprising:
   a processor and a computer-readable non-transitory storage medium, wherein the processor, by executing a program stored in the computer-readable non-transitory storage medium is configured to
   set multiple possible behaviors of an own vehicle when the own vehicle travels along a planned route, the multiple possible behaviors of the own vehicle including waiting, slow traveling, traveling, and turning on direction indicator;
   set multiple possible behaviors of a different vehicle existing around the own vehicle corresponding to each of the multiple possible behaviors of the own vehicle, the multiple possible behaviors of the different vehicle including waiting, slow traveling, traveling, and turning on direction indicator, wherein the traveling indicates a moving of the own vehicle at a first speed that is equal to or higher than a predetermined speed, and the slow traveling indicates a moving of the own vehicle at a second speed that is slower than the predetermined speed; and an approximation function device provided by a deep neural network or a support vector machine, the approximation function device being configured to output information indicating a contact possibility between the own vehicle and the different vehicle for each of combinations of the multiple possible behaviors of the own vehicle and the multiple possible behaviors of the different vehicle, wherein the processor selects one of the multiple possible behaviors of the own vehicle based on the information output from the approximation function device, the approximation function device generates, by learning using the deep neural network or the support vector machine, traveling situation related reward data, the approximation function device generates the traveling situation related reward data by:
- simulating multiple combinations of traveling situations of the own vehicle and traveling situations of the different vehicle under multiple different environments;
- assigning a first reward to a first traveling situation of the own vehicle in which the own vehicle succeeds in avoiding a contact with the different vehicle; and
- assigning a second reward to a second traveling situation of the own vehicle in which the own vehicle contacts with the different vehicle, the second reward being set to be lower than the first reward, the approximation function device:
- assigns, with reference to the traveling situation related reward data learned by the approximation function device, a reward to each of the multiple possible behaviors of the own vehicle for each of combinations of the multiple possible behaviors of the own vehicle and the multiple possible behaviors of the different vehicle; and
- outputs the rewards as the information indicating the contact possibility between the own vehicle and the different vehicle, and the processor selects one of the multiple possible behaviors of the own vehicle, which has a highest reward assigned by the approximation function device.

2. The vehicle behavior generation device according to claim 1, wherein the approximation function device further simulates combinations of (i) the multiple possible behaviors and speeds of the own vehicle and (ii) the multiple possible behaviors and speeds of the different vehicle under multiple different environments.

3. The vehicle behavior generation device according to claim 1, wherein the processor is further configured to:
set the multiple possible behaviors of the own vehicle based on a traffic signal state that controls a traffic on a road, and
set the multiple possible behaviors of the different vehicle based on the traffic signal state.

4. The vehicle behavior generation device according to claim 1, wherein the processor is further configured to set the multiple possible behaviors of the different vehicle based on a driving characteristic of the different vehicle.

5. The vehicle behavior generation device according to claim 1, wherein the processor is further configured to:
generate (i) a planned traveling track of the own vehicle corresponding to each of the multiple possible behaviors of the own vehicle and (ii) a planned traveling track of the different vehicle corresponding to each of the multiple possible behaviors of the different vehicle, the approximation function device outputs the information indicating the contact possibility between the own vehicle and the different vehicle based on each combination of the planned traveling track of the own vehicle and the planned traveling track of the different vehicle.

6. A vehicle behavior generation device applied to an autonomous driving system controlling a vehicle to perform an autonomous driving, the vehicle behavior generation device comprising:

a processor and a computer-readable non-transitory storage medium, wherein the processor, by executing a program stored in the computer-readable non-transitory storage medium is configured to set multiple possible behaviors of an own vehicle when the own vehicle travels along a planned route, the multiple possible behaviors of the own vehicle including waiting, slow traveling, traveling, and turning on direction indicator; and set multiple possible behaviors of a different vehicle existing around the own vehicle corresponding to each of the multiple possible behaviors of the own vehicle, the multiple possible behaviors of the different vehicle including waiting, slow traveling, traveling, and turning on direction indicator, wherein the traveling indicates a moving of the own vehicle at a first speed that is equal to or higher than a predetermined speed, and the slow traveling indicates a moving of the own vehicle at a second speed that is slower than the predetermined speed; and an approximation function device provided by a deep neural network or a support vector machine, the approximation function device being configured to output information indicating a contact possibility between the own vehicle and the different vehicle for each of combinations of the multiple possible behaviors of the own vehicle and the multiple possible behaviors of the different vehicle, wherein the processor selects one of the multiple possible behaviors of the own vehicle based on the information output from the approximation function device, the approximation function device assigns a reward to each of the multiple possible behaviors of the own vehicle for each of combinations of the multiple possible behaviors of the own vehicle and the multiple possible behaviors of the different vehicle, the approximation function device acquires a highest reward and a second highest reward, among the rewards assigned to the multiple possible behaviors of the own vehicle for the combinations of the multiple possible behaviors of the own vehicle and the multiple possible behaviors of the different vehicle, and when a difference between the highest reward and the second highest reward is less than a predetermined value,
the processor sets subsequent multiple possible behaviors of the own vehicle to be taken after each of the combinations of the multiple possible behaviors of the own vehicle and the multiple possible behaviors of the different vehicle, the processor sets subsequent multiple possible behaviors of the different vehicle corresponding to each of the subsequent multiple possible behaviors of the own vehicle, the approximation function device outputs the information indicating the contact possibility between the own vehicle and the different vehicle for each of combinations of the subsequent multiple possible behaviors of the own vehicle and the subsequent multiple possible behaviors of the different vehicle, and the processor selects one of the subsequent multiple possible behaviors of the own vehicle, which is assigned with a reward greater than a reward of each of the remaining subsequent multiple possible behaviors by the predetermined value or more.

7. The vehicle behavior generation device according to claim 6, wherein
the approximation function device generates, by learning, traveling situation related reward data,
the approximation function device generates the traveling situation related reward data by:
simulating multiple combinations of traveling situations of the own vehicle and traveling situations of the different vehicle under multiple different environments;
assigning a first reward to a first traveling situation of the own vehicle in which the own vehicle succeeds in avoiding a contact with the different vehicle; and
assigning a second reward to a second traveling situation of the own vehicle in which the own vehicle contacts with the different vehicle, the second reward being set to be lower than the first reward, and
the approximation function device:
assigns, with reference to the traveling situation related reward data learned by the approximation function device, the reward to each of the multiple possible behaviors of the own vehicle for each of combinations of the multiple possible behaviors of the own vehicle and the multiple possible behaviors of the different vehicle; and
outputs the rewards as the information indicating the contact possibility between the own vehicle and the different vehicle.

8. The vehicle behavior generation device according to claim 6, wherein
the processor is further configured to repeatedly select one of the subsequent multiple possible behaviors of the own vehicle by a predetermined number of times, and
when the rewards assigned to the subsequent multiple possible behaviors of the own vehicle have no difference equal to or greater than the predetermined value, the processor is further configured to select, in a last repeated cycle, one of the subsequent multiple possible behaviors of the own vehicle which has a highest reward.

9. A vehicle behavior generation method executed by at least one processor, the vehicle behavior generation method comprising:
setting multiple possible behaviors of an own vehicle when the own vehicle travels along a planned route, the multiple possible behaviors of the own vehicle including waiting, slow traveling, traveling, and turning on direction indicator;
setting multiple possible behaviors of a different vehicle existing around the own vehicle corresponding to each of the set multiple possible behaviors of the own vehicle, the multiple possible behaviors of the different vehicle including waiting, slow traveling, traveling, and turning on direction indicator, wherein the traveling indicates a moving of the own vehicle at a first speed that is equal to or higher than a predetermined speed, and the slow traveling indicates a moving of the own vehicle at a second speed that is slower than the predetermined speed;
outputting, using an approximation function device provided by a deep neural network or a support vector machine, information indicating a contact possibility between the own vehicle and the different vehicle for each of combinations of the set multiple possible behaviors of the own vehicle and the set multiple possible behaviors of the different vehicle;
selecting one of the multiple possible behaviors of the own vehicle based on the outputted information from the approximation function device;
generating, using the approximation function device, traveling situation related reward data by learning using the deep neural network or the support vector machine, wherein the generating of traveling situation related reward data includes: (i) simulating multiple combinations of traveling situations of the own vehicle and traveling situations of the different vehicle under multiple different environments; (ii) assigning a first reward to a first traveling situation of the own vehicle in which the own vehicle succeeds in avoiding a contact with the different vehicle; (iii) assigning a second reward to a second situation of the own vehicle in which the own vehicle contacts with the different vehicle, the second reward being set to be lower than the first reward;
assigning, using the approximation function device and with reference to the traveling situation related reward data learned by the approximation function device, a reward to each of the multiple possible behaviors of the own vehicle for each of combinations of the multiple possible behaviors of the own vehicle and the multiple possible behaviors of the different vehicle;
outputting, using the approximation function device, the rewards as the information indicating the contact possibility between the own vehicle and the different vehicle; and
selecting one of the multiple possible behaviors of the own vehicle, which has a highest reward.

10. The vehicle behavior generation method according to claim 9, wherein
the approximation function device further simulates combinations of (i) the multiple possible behaviors and speeds of the own vehicle and (ii) the multiple possible behaviors and speeds of the different vehicle under the multiple different environments.

11. The vehicle behavior generation method according to claim 9, further comprising:
setting the multiple possible behaviors of the own vehicle based on a traffic signal state that controls a traffic on a road; and
setting the multiple possible behaviors of the different vehicle based on the traffic signal state.

12. The vehicle behavior generation method according to claim 9, further comprising
setting the multiple possible behaviors of the different vehicle based on a driving characteristic of the different vehicle.

13. A vehicle behavior generation method executed by at least one processor, the vehicle behavior generation method comprising:
- setting multiple possible behaviors of an own vehicle when the own vehicle travels along a planned route, the multiple possible behaviors of the own vehicle including waiting, slow traveling, traveling, and turning on direction indicator;
- setting multiple possible behaviors of a different vehicle existing around the own vehicle corresponding to each of the set multiple possible behaviors of the own vehicle, the multiple possible behaviors of the different vehicle including waiting, slow traveling, traveling, and turning on direction indicator, wherein the traveling indicates a moving of the own vehicle at a first speed that is equal to or higher than a predetermined speed, and the slow traveling indicates a moving of the own vehicle at a second speed that is slower than the predetermined speed;
- assigning a reward to each of the multiple possible behaviors of the own vehicle for each of combinations of the multiple possible behaviors of the own vehicle and the multiple possible behaviors of the different vehicle;
- outputting, as information indicating a contact possibility between the own vehicle and the different vehicle, the reward assigned to each of the multiple possible behaviors of the own vehicle for each of combinations of the multiple possible behaviors of the own vehicle and the multiple possible behaviors of the different vehicle;
- selecting one of the multiple possible behaviors of the own vehicle based on the outputted information;
- acquiring a highest reward and a second highest reward, among the rewards assigned to the multiple possible behaviors of the own vehicle for the combinations of the multiple possible behaviors of the own vehicle and the multiple possible behaviors of the different vehicle; and
- when a difference between the highest reward and the second highest reward is less than a predetermined value,
  - setting subsequent multiple possible behaviors of the own vehicle to be taken after each of the combinations of the multiple possible behaviors of the own vehicle and the multiple possible behaviors of the different vehicle,
  - setting subsequent multiple possible behaviors of the different vehicle corresponding to each of the subsequent multiple possible behaviors of the own vehicle,
  - outputting the information indicating the contact possibility between the own vehicle and the different vehicle for each of combinations of the subsequent multiple possible behaviors of the own vehicle and the subsequent multiple possible behaviors of the different vehicle, and
  - selecting one of the subsequent multiple possible behaviors of the own vehicle, which is assigned with a reward greater than a reward of each of the remaining subsequent multiple possible behaviors by the predetermined value or more.

14. The vehicle behavior generation method according to claim 13, further comprising:
- generating, using an approximation function device provided by a deep neural network or a support vector machine, traveling situation related reward data by learning, wherein the generating of traveling situation related reward data includes: (i) simulating multiple combinations of traveling situations of the own vehicle and traveling situations of the different vehicle under multiple different environments; (ii) assigning a first reward to a first traveling situation of the own vehicle in which the own vehicle succeeds in avoiding a contact with the different vehicle; (iii) assigning a second reward to a second situation of the own vehicle in which the own vehicle contacts with the different vehicle, the second reward being set to be lower than the first reward;
- assigning, using the approximation function device and with reference to the traveling situation related reward data learned by the approximation function device, the reward to each of the multiple possible behaviors of the own vehicle for each of combinations of the multiple possible behaviors of the own vehicle and the multiple possible behaviors of the different vehicle; and
- outputting the rewards as the information indicating the contact possibility between the own vehicle and the different vehicle.

15. The vehicle behavior generation method according to claim 13, further comprising:
- repeatedly selecting one of the subsequent multiple possible behaviors of the own vehicle by a predetermined number of times; and
- when the rewards assigned to the subsequent multiple possible behaviors of the own vehicle have no difference equal to or greater than the predetermined value, selecting, in a last repeated cycle, one of the subsequent multiple possible behaviors of the own vehicle which has a highest reward.

16. A vehicle behavior generation program product stored in a computer-readable non-transitory storage medium, the vehicle behavior generation program product comprising instructions to be executed by at least one processor, the instructions comprising:
- setting multiple possible behaviors of an own vehicle when the own vehicle travels along a planned route, the multiple possible behaviors of the own vehicle including waiting, slow traveling, traveling, and turning on direction indicator;
- setting multiple possible behaviors of a different vehicle existing around the own vehicle corresponding to each of the set multiple possible behaviors of the own vehicle, the multiple possible behaviors of the different vehicle including waiting, slow traveling, traveling, and turning on direction indicator, wherein the traveling indicates a moving of the own vehicle at a first speed that is equal to or higher than a predetermined speed, and the slow traveling indicates a moving of the own vehicle at a second speed that is slower than the predetermined speed;
- outputting, using an approximation function device provided by a deep neural network or a support vector machine, information indicating a contact possibility between the own vehicle and the different vehicle for each of combinations of the set multiple possible behaviors of the own vehicle and the set multiple possible behaviors of the different vehicle;
- selecting one of the multiple possible behaviors of the own vehicle based on the outputted information from the approximation function device;
- generating, using the approximation function device, traveling situation related reward data by learning using the deep neural network or the support vector machine, wherein the generating of traveling situation related reward data includes: (i) simulating multiple combinations of traveling situations of the own vehicle and traveling situations of the different vehicle under multiple different environments; (ii) assigning a first reward to a first traveling situation of the own vehicle in which the own vehicle succeeds in avoiding a contact with the different vehicle; (iii) assigning a second reward to a second situation of the own vehicle in which the own vehicle contacts with the different vehicle, the second reward being set to be lower than the first reward;

assigning, using the approximation function device and with reference to the traveling situation related reward data learned by the approximation function device, a reward to each of the multiple possible behaviors of the own vehicle for each of combinations of the multiple possible behaviors of the own vehicle and the multiple possible behaviors of the different vehicle;

outputting, using the approximation function device, the rewards as the information indicating the contact possibility between the own vehicle and the different vehicle; and selecting one of the multiple possible behaviors of the own vehicle, which has a highest reward.

17. The vehicle behavior generation program product according to claim 16, wherein
the approximation function device further simulates combinations of (i) the multiple possible behaviors and speeds of the own vehicle and (ii) the multiple possible behaviors and speeds of the different vehicle under the multiple different environments.

18. The vehicle behavior generation program product according to claim 16, wherein
the instructions executed by the at least one processor further includes:
setting the multiple possible behaviors of the own vehicle based on a traffic signal state that controls a traffic on a road; and
setting the multiple possible behaviors of the different vehicle based on the traffic signal state.

19. The vehicle behavior generation program product according to claim 16, wherein
the instructions executed by the at least one processor further includes setting the multiple possible behaviors of the different vehicle based on a driving characteristic of the different vehicle.

20. A vehicle behavior generation program product stored in a computer-readable non-transitory storage medium, the vehicle behavior generation program product comprising instructions to be executed by at least one processor, the instructions comprising:
setting multiple possible behaviors of an own vehicle when the own vehicle travels along a planned route, the multiple possible behaviors of the own vehicle including waiting, slow traveling, traveling, and turning on direction indicator;
setting multiple possible behaviors of a different vehicle existing around the own vehicle corresponding to each of the set multiple possible behaviors of the own vehicle, the multiple possible behaviors of the different vehicle including waiting, slow traveling, traveling, and turning on direction indicator, wherein the traveling indicates a moving of the own vehicle at a first speed that is equal to or higher than a predetermined speed, and the slow traveling indicates a moving of the own vehicle at a second speed that is slower than the predetermined speed; and assigning a reward to each of the multiple possible behaviors of the own vehicle for each of combinations of the multiple possible behaviors of the own vehicle and the multiple possible behaviors of the different vehicle;

outputting, as information indicating a contact possibility between the own vehicle and the different vehicle, the reward assigned to each of the multiple possible behaviors of the own vehicle for each of combinations of the multiple possible behaviors of the own vehicle and the multiple possible behaviors of the different vehicle;

selecting one of the multiple possible behaviors of the own vehicle based on the outputted information;

acquiring a highest reward and a second highest reward, among the rewards assigned to the multiple possible behaviors of the own vehicle for the combinations of the multiple possible behaviors of the own vehicle and the multiple possible behaviors of the different vehicle; and when a difference between the highest reward and the second highest reward is less than a predetermined value,
setting subsequent multiple possible behaviors of the own vehicle to be taken after each of the combinations of the multiple possible behaviors of the own vehicle and the multiple possible behaviors of the different vehicle,
setting subsequent multiple possible behaviors of the different vehicle corresponding to each of the subsequent multiple possible behaviors of the own vehicle,
outputting the information indicating the contact possibility between the own vehicle and the different vehicle for each of combinations of the subsequent multiple possible behaviors of the own vehicle and the subsequent multiple possible behaviors of the different vehicle, and
selecting one of the subsequent multiple possible behaviors of the own vehicle, which is assigned with a reward greater than a reward of each of the remaining subsequent multiple possible behaviors by the predetermined value or more.

21. The vehicle behavior generation program product according to claim 20, wherein
the instructions executed by the at least one processor further includes:
generating, using an approximation function device provided by a deep neural network or a support vector machine, traveling situation related reward data by learning, wherein the generating of traveling situation related reward data includes: (i) simulating multiple combinations of traveling situations of the own vehicle and traveling situations of the different vehicle under multiple different environments; (ii) assigning a first reward to a first traveling situation of the own vehicle in which the own vehicle succeeds in avoiding a contact with the different vehicle; (iii) assigning a second reward to a second situation of the own vehicle in which the own vehicle contacts with the different vehicle, the second reward being set to be lower than the first reward;
assigning, with reference to the traveling situation related reward data learned by the approximation function device, the reward to each of the multiple possible behaviors of the own vehicle for each of combinations of the multiple possible behaviors of the own vehicle and the multiple possible behaviors of the different vehicle; and outputting the rewards as the information indicating the contact possibility between the own vehicle and the different vehicle.

22. The vehicle behavior generation program product according to claim 20, wherein the instructions executed by the at least one processor further includes:

repeatedly selecting one of the subsequent multiple possible behaviors of the own vehicle by a predetermined number of times; and when the rewards assigned to the subsequent multiple possible behaviors of the own vehicle have no difference equal to or greater than the predetermined value, selecting, in a last repeated cycle, one of the subsequent multiple possible behaviors of the own vehicle which has a highest reward.

* * * * *